US005665406A

United States Patent [19]
Reed et al.

[11] Patent Number: 5,665,406
[45] Date of Patent: *Sep. 9, 1997

[54] POLYOL COATED CHEWING GUM HAVING IMPROVED SHELF LIFE AND METHOD OF MAKING

[75] Inventors: Michael A. Reed, Merrillville, Ind.; Lindell C. Richey, Lake Zurich, Ill.; Jeffrey S. Hook, Berwyn, Ill.; Robert J. Yatka, Orland Park, Ill.; Henry T. Tyrpin, Midlothian, Ill.; Kevin B. Broderick, Berwyn, Ill.; Marc A. Meyers, Naperville, Ill.

[73] Assignee: Wm. Wrigley Jr. Company, Chicago, Ill.

[*] Notice: The term of this patent shall not extend beyond the expiration date of Pat. No. 5,270,061.

[21] Appl. No.: 578,608

[22] PCT Filed: Sep. 15, 1993

[86] PCT No.: PCT/US93/08730

§ 371 Date: Dec. 27, 1995

§ 102(e) Date: Dec. 27, 1995

[87] PCT Pub. No.: WO95/07622

PCT Pub. Date: Mar. 23, 1995

Related U.S. Application Data

[63] Continuation-in-part of Ser. No. 857,577, Mar. 26, 1992, Pat. No. 5,270,061, and a continuation-in-part of Ser. No. 855,251, Mar. 23, 1992, Pat. No. 5,248,508.

[51] Int. Cl.$^6$ ............................................. A23G 3/30
[52] U.S. Cl. ............................................. 426/5; 426/6
[58] Field of Search .............................. 426/3, 4, 5, 6

[56] References Cited

U.S. PATENT DOCUMENTS

| | | | |
|---|---|---|---|
| 3,973,050 | 8/1976 | Hayashibara et al. | 426/552 |
| 4,105,801 | 8/1978 | Dogliotti et al. | 426/99 |
| 4,127,677 | 11/1978 | Fronczowski et al. | 426/5 |
| 4,146,653 | 3/1979 | Mader et al. | 427/3 |
| 4,238,510 | 12/1980 | Cherukuri et al. | 426/5 |
| 4,423,086 | 12/1983 | Devos et al. | 427/3 |

(List continued on next page.)

FOREIGN PATENT DOCUMENTS

| | | |
|---|---|---|
| 0009325 | 4/1980 | European Pat. Off. |
| 0201412 | 11/1986 | European Pat. Off. |
| 0390299 | 10/1990 | European Pat. Off. |
| 0497439 | 8/1992 | European Pat. Off. |
| 0511761 | 11/1992 | European Pat. Off. |
| 0530995 | 3/1993 | European Pat. Off. |
| 0625311 | 11/1994 | European Pat. Off. |
| 1137104 | 1/1957 | France . |
| 2464656 | 3/1981 | France . |
| 53-127858 | 11/1978 | Japan . |
| 64-51045 | 2/1989 | Japan . |
| 1-225458 | 9/1989 | Japan . |
| 2-104259 | 4/1990 | Japan . |
| 4-287659 | 10/1992 | Japan . |
| 4-287658 | 10/1992 | Japan . |
| 6-292511 | 10/1994 | Japan . |
| 7-55898 | 6/1995 | Japan . |
| 1253300 | 11/1971 | United Kingdom . |
| WO89/03170 | 4/1989 | WIPO . |
| WO90/06317 | 6/1990 | WIPO . |
| WO90/06061 | 6/1990 | WIPO . |
| WO90/07864 | 7/1990 | WIPO . |
| WO90/13994 | 11/1990 | WIPO . |
| WO91/03147 | 3/1991 | WIPO . |
| WO91/07100 | 5/1991 | WIPO . |
| WO92/16542 | 10/1992 | WIPO . |
| WO94/16574 | 8/1994 | WIPO . |
| WO9508925 | 4/1995 | WIPO . |

OTHER PUBLICATIONS (anon.) Lacty®, A New Bulk Sweetner, Confectionary Production, p. 656 (Sep., 1990).
Ir. I. H. Blankers, PURAC biochem bv, LACTY®—A Unique Reduced Calorie Sweetner (Oct., 1992).
CCA biochem b.v., Application Information, Hard Panned Chewing Gum (undated, 1 page).
CCA biochem b.v., Application Information, Starting Point Formulation for a Lacty®–containing Chocolate and Chewing Gum (undated, 1 page).
CCA biochem b.v., International Approval Situation for Lactitol (1988) (1 page).
CCA biochem bv, LACTY®/ A New Reduced Calorie Sweetner (undated).
CCA biochem b.v., Product Data, LACTY®–M (undated, 1 page).
Ir. C.H. den Uijl, CCA biochem bv, LACTY®, Properties and Applications of this New Reduced Calorie Sweetner (1987).
Palatinit® Coating Literature, Palatinit Sussungsmittel GmbH (undated, pp. 73–76).
Palantinit®–INFOPAC, Palatinit Sussungsmittel GmbH (undated, about 100 pages).
PURAC biochem, LACTY® Containing Chewing Gum (undated, 1 page).
PURAC biochem, LACTY®/ A Unique Reduced Calorie Sweetner (undated).

*Primary Examiner*—Arthur L. Corbin
*Attorney, Agent, or Firm*—Brinks Hofer Gilson & Lione

[57] ABSTRACT

A dual composition hard coated chewing gum is provided, which exhibits improved long-term shelf stability under storage conditions involving constant exposure to the moisture contained in the atmosphere. The dual composition hard coated chewing gum is ideally suited for pellet chewing gum having pellet shapes which cannot be easily protected from atmospheric moisture by packaging. The dual composition hard coated chewing gum has a gum center which includes a gum base, a bulk portion and one or more flavoring agents. The dual composition hard coated chewing gum also has an outer coating which includes layers which contain from about 50 to about 100% of at least two different polyols preferably lactitol, maltitol, hydrogenated isomaltulose or erythritol. A method of preparing the dual composition hard coated chewing gum is also provided. Lactitol, maltitol or hydrogenated isomaltulose is preferably applied first, and the covered with an erythritol coating.

28 Claims, No Drawings

U.S. PATENT DOCUMENTS

| | | | |
|---|---|---|---|
| 4,556,565 | 12/1985 | Arima et al. | 426/3 |
| 4,623,543 | 11/1986 | Motegi et al. | 426/103 |
| 4,681,766 | 7/1987 | Huzinec et al. | 426/5 |
| 4,717,765 | 1/1988 | Hirao et al. | 536/124 |
| 4,786,511 | 11/1988 | Huzinec et al. | 426/5 |
| 4,792,453 | 12/1988 | Reed et al. | 426/5 |
| 4,828,845 | 5/1989 | Zamudio-Tena et al. | 426/5 |
| 4,840,797 | 6/1989 | Boursier | 424/475 |
| 4,902,525 | 2/1990 | Kondou | 426/548 |
| 4,933,188 | 6/1990 | Cherukuri et al. | 426/3 |
| 4,959,225 | 9/1990 | Wong et al. | 426/3 |
| 4,973,486 | 11/1990 | Matsumoto et al. | 426/548 |
| 4,999,058 | 3/1991 | Kawashima et al. | 127/29 |
| 5,017,400 | 5/1991 | Olinger et al. | 426/660 |
| 5,080,916 | 1/1992 | Kondou | 426/96 |
| 5,120,550 | 6/1992 | Van Der Schueren | 426/3 |
| 5,135,761 | 8/1992 | Dave et al. | 426/5 |
| 5,144,024 | 9/1992 | Pepper et al. | 536/128 |
| 5,160,546 | 11/1992 | Kawashima et al. | 127/60 |
| 5,171,589 | 12/1992 | Richey et al. | 426/5 |
| 5,248,508 | 9/1993 | Reed et al. | 426/5 |
| 5,270,061 | 12/1993 | Reed et al. | 426/5 |
| 5,376,389 | 12/1994 | Reed et al. | 426/5 |

POLYOL COATED CHEWING GUM HAVING IMPROVED SHELF LIFE AND METHOD OF MAKING

CROSS-REFERENCE TO RELATED APPLICATION

This is a continuation-in-part of application Ser. No. 07/857,577, filed Mar. 26, 1992, by Michael A. Reed and Ulesses P. Orr, now U.S. Pat. No. 5,270,061; and a continuation-in-part of application Ser. No. 07/855,251, filed Mar. 23, 1992, by Michael A. Reed and Jeffrey S. Hook, now U.S. Pat. No. 5,248,508.

BACKGROUND OF THE INVENTION

1. Field of the Invention

This invention relates to a hard-coated chewing gum with dual polyol coatings (i.e., coatings of two or more polyols), having an extended shelf life.

2. Discussion of Related Art

This invention relates to a hard-coated chewing gum in which the hard coating is composed of two or more polyols, having an improved coating quality and extended shelf life.

Specifically, this invention relates to a chewing gum in pellet form, having one or more sequentially added coats of polyols, preferably selected from the group consisting of lactitol, maltitol, hydrogenated isomaltulose and erythritol. The hard pellets are prepared by coating a gum core with syrups of two or more polyols. The coated gum has improved coating quality and longer shelf life.

Chewing gums, including pellet chewing gums, are frequently enclosed with hard or soft coatings. Coatings provide an opportunity for the manufacturer to vary product characteristics such as taste, appearance and nutritional value. In recent years, efforts have been devoted to producing sugarless hard coatings for use in chewing gum. Sugarless coatings which have been investigated include coatings containing compounds such as xylitol, sorbitol, mannitol and hydrogenated starch hydrolysates.

Sugarless xylitol coated pellet gums have become very popular as products are being manufactured in Europe and Canada. The cost of xylitol is quite high, and partial replacement of the xylitol in the coating would be an advantage. Two polyols in the same coating solution cause problems in the coating process, but sequential coating of gum pellets with two solutions, each containing a polyol, one of which is xylitol, was found to be an acceptable process. U.S. patent application Ser. No. 07/857,577, filed Mar. 26, 1992, by Michael A. Reed and Ulesses P. Orr, now U.S. Pat. No. 5,270,061, taught sequential coating with a combination of hydrogenated isomaltulose and xylitol. Concurrently filed U.S. patent application Ser. No. 121,775, filed Sep. 15, 1993, by Michael A. Reed, Lindell C. Richey, Jeffrey S. Hook and Philip G. Schnell, now U.S. Pat. No. 5,376,389, discloses hard-coated chewing gum coated successively with xylitol and another polyol, preferably lactitol or maltitol.

U.S. Pat. No. 4,792,453, issued Dec. 20, 1988, to Michael A. Reed, Mansukh M. Patel and Vasek J. Kures, discloses a chewing gum having a sugarless chewing gum center coated with a syrup containing hydrogenated isomaltulose. The sugarless center may include various constituents such as water, an insoluble gum base, a bulking agent, a softener, an artificial sweetener and a flavoring agent. The sugarless chewing gum center of the reference has a water content of less than about 2.5 weight percent, preferably less than about 1.5 weight percent and most preferably less than about 1.0 weight percent. The use of a center having a low water content, is intended to prevent or reduce the tendency of the gum center from being a water donor to the hard coating.

Sugarless gums coated with hydrogenated isomaltulose-containing syrup possess excellent appearance, taste, texture, mouth feel and other desirable properties of hard coated chewing gums. Also, it has been found that the relatively anhydrous gum center has the capability of pulling moisture from the hydrogenated isomaltulose-containing coating, causing the coating to exhibit superior hardness. This moisture-pulling from the gum center is attributable, in large part, to the use of glycerin as a softener in the gum center. The moisture-pulling effect is the most pronounced in hard coated chewing gums which contain moderate or relatively high amounts of glycerin in the chewing gum center, on the order of from about 5 to about 15 percent by weight of the chewing gum center.

The tendency of glycerin to pull moisture from the hydrogenated isomaltulose-containing coating can operate as a disadvantage in certain pellet-shaped hard coated chewing gums which, due to their shape, are difficult to isolate from a moisture-containing environment by packaging. For example, pellet gum which is shaped like pillows is difficult to protect from moisture because it is difficult to form a good quality, low or non-moisture permeable package which is suitable for these pellets.

Conventional panning procedures generally coat with sucrose, but recent advances in panning have allowed the use of other carbohydrate materials to be used in the place of sucrose. Some of these components include, but are not limited to, dextrose, maltose, xylitol, hydrogenated isomaltulose and other new polyols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum and gum tragacanth, insoluble carbonates like calcium carbonate or magnesium carbonate and talc.

Hydrogenated isomaltulose is a monohydrate. If a hydrogenated isomaltulose-containing coating on a pellet gum becomes too dry, e.g. due to the presence of glycerin, the coating becomes more hygroscopic and absorbs moisture from the surrounding atmosphere. This continuous drying and absorption of moisture from the atmosphere reduces the shelf life of the pellet gum by causing the coating to soften and lose its desirable texture, appearance and mouth feel. Thus, the coating itself must be sufficiently shelf stable against moisture absorption so as not to allow the coating to deteriorate during its shelf life.

Commonly assigned U.S. patent application Ser. No. 07/855,251, filed Mar. 23, 1992, by Michael A. Reed and Jeffrey S. Hook, now U.S. Pat. No. 5,248,508, entitled HARD COATED GUM WITH IMPROVED SHELF LIFE, discloses a chewing gum in pellet form which includes a center portion and an outer coating which contains hydrogenated isomaltulose.

Coating with xylitol is described in U.S. Pat. No. 4,105,801, issued Aug. 8, 1978, to Dogliotti; U.S. Pat. No. 4,127,677, issued Nov. 28, 1978, to Fronczowski et al.; U.S. Pat. No. 4,146,653, issued Mar. 27, 1979, to Mader et al.; U.S. Pat. No. 4,681,766, issued Jul. 21, 1987, to Huzinec et al.; U.S. Pat. No. 4,786,511, issued Nov. 22, 1988, also to Huzinec et al.; and U.S. Pat. No. 4,828,845, issued May 9, 1989, to Zamudio-Tena et al.

Patents and publications which discuss lactitol include U.S. Pat. No. 3,973,050, issued Aug. 3, 1976, to Hayashibara et al. (foods and drinks containing lactitol as a sweetener); U.S. Pat. No. 4,973,486, issued Nov. 27, 1990, to Matsumoto et al. (formulation of lactitol-containing food); and U.S. Pat. No. 4,999,058, issued Mar. 12, 1991, and U.S. Pat. No. 5,160,546, issued Nov. 3, 1992, both to Kawashima et al. (production of lactitol trihydrate; use in chewing gum, column 6 of each patent); British Patent 1,253,300, Hayashibara, published Nov. 10, 1971 (food materials containing lactitol); PCT published Patent Applications WO 90/06317, published Jun. 14, 1990, and WO 92/16542, published Oct. 1, 1992, both in the names of Heikkilä et al. (preparation of crystalline lactitol and use as sweetening agent; use in chewing gums mentioned at page 1, lines 10–11 of '317 and page 5, line 13 of '542); Ir. I. H. Blankers, PURAC biochem bv, LACTY®-A UNIQUE REDUCED CALORIE SWEETENER (October, 1992); CCA biochem b.v., Application Information, Hard Panned Chewing Gum (undated, 1 page); CCA biochem b.v., Application Information, Starting Point Formulation for a Lacty®-containing Chocolate and Chewing Gum (undated, 1 page); CCA biochem b.v., INTERNATIONAL APPROVAL SITUATION FOR LACTITOL (1988)(1 page); CCA biochem bv, LACTY®/A NEW REDUCED CALORIE SWEETENER (undated)(page 5, use in chewing gum); CCA biochem b.v., Product Data, LACTY®-M (undated, 1 page); Ir. C. H. den Uijl, CCA biochem by, LACTY®, PROPERTIES AND APPLICATIONS OF THIS NEW REDUCED CALORIE SWEETENER (1987); (anon.) Lacty®, A New Bulk Sweetener, CONFECTIONERY PRODUCTION, p. 656 (September 1990); PURAC biochem, LACTY® CONTAINING CHEWING GUM (undated, 1 page); and PURAC biochem, LACTY®/A UNIQUE REDUCED CALORIE SWEETENER (undated) (page 5, use in chewing gum).

Patents and publications which discuss maltitol include U.S. Pat. No. 4,556,565, issued Dec. 3, 1985, to Arima et al. (sweetening compositions comprising maltitol); U.S. Pat. No. 4,623,543, issued Nov. 18, 1986, to Motegi et al. (non-hygroscopic candies containing maltitol); U.S. Pat. No. 4,717,765, issued Jan. 5, 1988, to Hirao et al. (production and use of maltitol anhydrous crystals; used in chewing gum in Example 12 in column 13); U.S. Pat. No. 4,840,797, issued Jun. 20, 1989, to Boursier (maltitol coating); U.S. Pat. No. 4,933,188, issued Jun. 12, 1990, to Cherukuri et al. (maltitol sweetening/bulking agent); U.S. Pat. No. 4,959,225, issued Sep. 25, 1990, to Wong et al. (sweetening compositions comprising maltitol); and U.S. Pat. No. 5,120,551, issued Jun. 9, 1992, to Yatka et al. (maltitol syrup); European Patent Publication 0,390,299, published Oct. 10, 1990, in the names of Bakal et al. (foodstuffs containing maltitol); and Japanese Patent Publications 53 (1978)-127,858, published Nov. 8, 1978 in the names of Fukuda et al. (chewing gum which may include maltitol) and 4 (1992)-287,659, published Oct. 13, 1992, in the names of Shigeni et al. (low-calorie sweetener containing maltitol).

Hydrogenated isomaltulose is made and sold under the trademark PALATINIT® by Palatinit Sussungsmittel GmbH, Germany. Publications which discuss hydrogenated isomaltulose include PCT applications WO 89/03170, published Apr. 20, 1989; WO 90/06061, published Jun. 14, 1990; WO 90/07864, published Jul. 26, 1990; WO 90/13994, published Nov. 29, 1990; and WO 91/03147, published Mar. 21, 1991, all in the names of Yatka et al., which disclose the use of Palatinit® hydrogenated isomaltulose coatings; Palatinit®-INFOPAC, Palatinit Sussungsmittel GmbH (synergistic effects appear when PALATINIT® hydrogenated isomaltulose is mixed with other sugar alcohols, for example, xylitol, sorbitol, or Lycasin, or when PALATINIT® hydrogenated isomaltulose is sweetened with sweetening agents (saccharin, cyclamate, aspartame); also formula for chewing gum containing PALATINIT® hydrogenated isomaltulose) and Palatinit® Coating Literature, Palatinit Sussungsmittel GmbH (coating dragées and panned goods with PALATINIT® hydrogenated isomaltulose).

Patents and publications which discuss erythritol include U.S. Pat. No. 4,902,525, issued Feb. 20, 1990, and U.S. Pat. No. 5,080,916, issued Jan. 14, 1992, both to Kondou; Japanese Patent Publications 64 (1989)-51,045, published Feb. 27, 1989, in the name of Kondo; 1 (1989)-225,458, published Sep. 8, 1989, in the names of Katsuragi et al.; 2 (1990)-104,259, published Apr. 17, 1990, in the name of Ito; 4 (1992)-287,658, published Oct. 13, 1992, in the name of Kondo; and 4 (1992)-287,659, published Oct. 13, 1992, in the name of Shigeni et al. (sweetening compositions containing meso-erythritol); U.S. Pat. No. 5,120,550, issued Jun. 9, 1992, to Van der Schueren (chewing gum made with sweetening agent containing erythritol and a liquid sugar); and European Patent Applications 0,009,325, published Apr. 2, 1980, in the name of Beerboom (reducing dental caries with sugarless chewing gum made with erythritol); 0,497,439, published Aug. 5, 1992, in the names of Gonze et al. (sweetener employing spray-dried erythritol); 0,511,761, published Nov. 4, 1992, in the names of Rapaille et al. (sweetening compositions containing erythritol); and 0,530,995, published Mar. 10, 1993, in the names of Gonze et al. (lozenge containing sweetener which is all or partly erythritol or maltitol).

Other patents and publications which may be of interest include U.S. Pat. No. 5,017,400, issued May 21, 1991, to Olinger et al. (non-cariogenic sweetener containing xylitol and maltitol; used in chewing gums, see Example I in columns 5–6); U.S. Pat. No. 5,135,761, issued Aug. 4, 1992, to Dave et al. (coated chewing gum with emulsifier subcoat); U.S. Pat. No. 5,144,024, issued Sep. 1, 1992, to Pepper et al. (shelf stable liquid xylitol compositions comprising polyols such as maltitol); U.S. Pat. No. 5,171,589, issued Dec. 15, 1992, to Richey et al. (coated chewing gum polished with colored wax); and PCT published Patent Application WO 91/07100, published May 30, 1991, in the names of Oravainen et al. (hard candy containing xylitol and optionally maltitol or lactitol). See also PCT Patent Application PCT/US92/11195, filed Dec. 23, 1992, in the names of Yatka et al., published Aug. 4, 1994 as PCT Application WO 94/16574 (chewing gum containing lactitol).

SUMMARY OF THE INVENTION

This invention is directed to a hard-coated chewing gum such as a pellet chewing gum, whose pellet shape does not lend itself to packaging of a type that would protect the pellets from atmospheric moisture. The hard-coated chewing gum is coated successively (i.e., not simultaneously) with one or more sequentially added coats of polyols, preferably selected from the group consisting of lactitol, maltitol, hydrogenated isomaltulose and erythritol.

Chewing gum pellets are subject to constant exposure to atmospheric moisture during shelf storage. The present invention provides a dual composition hard-coated chewing gum which gives improved coating quality and is shelf stable under these conditions.

According to the present invention, it has been found that lactitol, maltitol, hydrogenated isomaltulose and erythritol (and other polyols) may be used in a manner similar to that in which hydrogenated isomaltulose is used with xylitol, according to the teaching in U.S. patent application Ser. No. 07/857,577, filed Mar. 26, 1992, by Reed and Orr, now U.S. Pat. No. 5,270,061.

The chewing gum of the invention includes a center portion and an dual composition outer coating. The outer coating consists of layers having at least two compositions, preferably selected from the group consisting of lactitol, maltitol, hydrogenated isomaltulose and erythritol.

The outer coating preferably contains from about 50 to about 100 weight percent of two polyols. The outer coating may also include sweeteners, whiteners, colorants, coating adjuvants and flavors.

The total weight of the coating constitutes from about 10 to about 65 weight percent of the coated chewing gum product.

Any conventional chewing gum center formulation may be used for the gum center. Preferably, however, the gum center is sugarless and includes sorbitol, mannitol, xylitol, lactitol, maltitol and/or hydrogenated starch hydrolyzate, and an aqueous sorbitol liquid. A number of preferred gum center formulas are set forth in the Examples. The gum center constitutes from about 35 to about 90 weight percent of the chewing gum product.

With the foregoing in mind, it is a feature and advantage of the invention to provide a dual composition hard coated chewing gum which retains its hardness, texture, appearance and mouth feel during shelf storage which involves constant exposure to the atmosphere.

It is also a feature and advantage of the invention to provide a dual composition hard coated shelf-stable chewing gum which does not absorb significant quantities of moisture from the atmosphere.

It is also a feature and advantage of the invention to provide a dual composition hard coated shelf-stable chewing gum which is suitable for pellet gum having pellet shapes which do not lend themselves readily to protective packaging with respect to the atmosphere.

It is also a feature and advantage of the invention to provide a method of making an improved dual composition hard coated shelf-stable chewing gum.

The foregoing and other features and advantages of the invention will become further apparent from the following detailed description. The detailed description is to be construed as illustrative rather than limitative, with the scope of the invention being defined by the appended claims and equivalents thereof.

DETAILED DESCRIPTION

In accordance with the invention, a dual composition hard coated chewing gum is provided which has a dual composition hard outer coating and a softer chewing gum center portion.

As noted in U.S. Pat. Nos. 4,105,801; 4,127,677; 4,146,653; 4,681,766; 4,786,511; and 4,828,845, referred to above, xylitol, a polyol sugar substitute, can be used to coat various types of products, including chewing gum. Xylitol makes a quality coating for chewing gum, and a number of xylitol chewing gum products are currently on the market in the United States and Europe. Although the quality of product is good using a xylitol coating, the cost of xylitol is high.

It has been found, according to the present invention, that lactitol, maltitol, hydrogenated isomaltulose and erythritol are other polyol sugar substitutes that can be used in coating hard gum centers; and in fact, any edible polyol that can be crystallized to form a quality coating on a pellet may be used according to this invention.

By combining polyol coatings in this invention, the cost of coating can be significantly reduced, while still maintaining some of the advantages of more expensive coatings. Also, by coating a chewing gum pellet with layers of different polyols, both polyols may give a significant shelf life improvement to the pellet gum. Moisture absorption of the pellet may be reduced, giving extended shelf life to the product in unfavorable storage conditions and packaging problems.

The invention involves first preparing a soft (by comparison to the coating which is to follow) chewing gum center portion, and forming it into gum pellets (typically having a pillow or round shape) by conventional means. The pelletized chewing gum centers are then coated with one or more sequentially applied layers of polyol coatings.

The coating may be accomplished in a traditional manner as disclosed by one of the aforementioned U.S. Pat. Nos. 4,105,801; 4,127,677; 4,146,653; 4,681,766; 4,786,511; and 4,828,845. A preferred coating process, applicable to various polyols, is described below.

The preferred coating process uses solutions of the materials to be applied. Each coating solution contains one polyol, which should contain from about 50% polyol solids up to the saturation point of the polyol in the solvent, and preferably from about 60 to about 75 weight percent polyol solids. The syrups may comprise polyols dissolved in water or any other food quality solvent in an amount sufficient to yield a hard coating comprising from about 50 to about 100 weight percent polyol. More preferably, however, the syrup will comprise an amount of polyol sufficient to yield a hard coating comprising greater than about 90 weight percent polyol. Furthermore, the syrups and thus the layers of coating may contain minor quantities of other sugar substitutes such as sorbitol and mannitol in addition to the primary non-xylitol polyol.

Each coating step adds a small amount of polyol, depending on various factors including chiefly the concentration of the polyol in the coating syrup. Each individual coating step adds roughly 1% to the then-current weight of the pellet being coated.

The total amount of these polyol coatings may be from about 10% to about 65% by weight of the product obtained by the series of coatings, i.e., after the last coating step, the product contains from about 10% to about 65% polyol coating and from about 35% to about 90% gum center, by weight of the total product. Reaching this weight of coating will typically require from about 10 to about 65 individual coating steps. A preferred product contains from about 20% to about 50% by weight of combined polyol coating and from about 50 to about 80% gum center.

It is preferred that the polyols in the polyol coatings be selected from the group consisting of lactitol, maltitol, hydrogenated isomaltulose and erythritol. It is more highly preferred that layers of a polyol selected from the group consisting of lactitol, maltitol and hydrogenated isomaltulose be applied first, and then coatings of erythritol be applied in a similar fashion over the lactitol, maltitol or hydrogenated isomaltulose coatings.

The ratio of the first polyol to the second polyol in the coatings may vary widely, but the ratio is preferably about 1:1.

The dual composition hard outer coating includes layers of at least two polyol coatings. Each of the two components of the dual composition hard outer coating may be present as a single layer or as a plurality of layers. The dual composition hard coating may be present in any thickness or amount which is commercially acceptable.

Lactitol and maltitol, preferred for use in the present invention, are both polyols of the empirical formula $C_{12}H_{24}O_{11}$, and are reduced (hydrogenated) lactose and maltose, respectively. Lactitol and maltitol differ from the disaccharide sugars lactose and maltose in that one of the component sugars is reduced to a linear polyol structure, rather than the ring structure of the disaccharide sugar. Formal chemical names for lactitol and maltitol are 4-O-($\beta$-galactosyl)-D-glucitol and 4-O-($\alpha$-glucoparanosyl)-D-glucitol, respectively. The structural formula for lactitol is given in British Patent 1,253,300, at page 2; in Ir. I. H. Blankers, PURAC biochem by, LACTY®-A UNIQUE REDUCED CALORIE SWEETENER (October, 1992), at pages 2 and 6; and elsewhere in the LACTY® trade literature. The structural formula for maltitol is given in U.S. Pat. No. 4,933,188, issued Jun. 12, 1990, to Cherukuri et al., in column 5, and in European Patent Publication 0,390,299, published Oct. 10, 1990, in the names of Bakal et al., at page 3.

Lactitol is available from Purac America, Inc. in the United States, or from PURAC biochem in the Netherlands, under the trademark LACTY®. Maltitol is available from Roquette Corporation. Both materials are obtained in a crystalline powder form and since they are very soluble in water, can form concentrated coating solutions of 60–80% solids at high temperature.

Erythritol is a tetrahydic polyol or sugar alcohol, having the empirical formula $C_4H_{10}O_4$ and the structural formula $CH_2COH$—$CHOH$—$CHOH$—$CH_2OH$. It can be obtained by fermenting glucose with specially selected yeast strains in appropriate aqueous nutrient media, or by treating an aqueous alkali carbonate solution of 2-buten-1,4-diol with chlorine, and saponifying the resulting chlorohydrin. Erythritol is available from Mitsubishi Kasei America of White Plains, New York; and from Mitsubishi Kasei Corp., outside the United States, as a powder with a melting point of about 119° C. It has a sweetness level of about 75% of that of sucrose, and has good storage stability. Syrups of erythritol may be formed at room temperature at concentrations below 40%, its solubility limit at room temperature. At higher temperatures, syrups of higher concentrations may be formed. Erythritol is not approved for use in human food products or chewing gum in the United States. A GRAS affirmation petition for erythritol as a human food ingredient is being prepared by Mitsubishi Kasei Corp. Erythritol does not contribute to dental caries, does not cause gastric distress, and does not contribute significantly to caloric intake.

Either or both components of the coating may also contain other ingredients such as flavoring agents, artificial sweeteners and dispersing agents, coloring agents, film formers and binding agents. Flavoring agents contemplated by the present invention include those commonly known in the art such as essential oils, synthetic flavors or mixtures thereof, including but not limited to oils derived from plants and fruits such as citrus oils, fruit essences, peppermint oil, spearmint oil, other mint oils, clove oil, oil of wintergreen, anise and the like. The flavoring agents may be added to the coating syrup in an amount such that the coating will contain from about 0.2 to about 1.2 weight percent flavoring agent and preferably from about 0.7 to about 1.0 weight percent flavoring agent.

Artificial sweeteners contemplated for use in the coating include but are not limited to synthetic substances, saccharin, thaumatin, alitame, saccharin salts, aspartame, sucralose and acesulfame-K. The artificial sweetener may be added to the coating syrup in an amount such that the coating will contain from about 0.05 to about 0.3 weight percent and preferably from about 0.10 to about 0.15 weight percent artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. Titanium dioxide is a presently preferred dispersing agent of the present invention. The dispersing agent may be added to the coating syrup in amounts such that the coating will contain from about 0.1 to about 1.0 weight percent and preferably from about 0.3 to about 0.6 weight percent of the agent.

Coloring agents are preferably added directly to the syrup in the dye or lake form. Coloring agents contemplated by the present invention include food quality dyes. Film formers preferably added to the syrup, include methyl cellulose, gelatins, hydroxypropyl cellulose, ethyl cellulose, hydroxyethyl cellulose, carboxymethyl cellulose and the like and combinations thereof. Binding agents may be added either as an initial coating on the chewing gum center or may be added directly into the syrup. Binding agents contemplated by the present invention include gum arabic, alginate, cellulosics, vegetable gums and the like.

The softer chewing gum center includes a water soluble bulk portion, a generally water insoluble chewing gum base and one or more flavoring agents. The water soluble portion dissipates over a period of time during chewing, while the gum base portion remains in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate, ester gums and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils and cocoa butter. Commonly used waxes include petroleum waxes such as paraffin and microcrystalline wax, natural waxes such as beeswax, candelilla, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes from about 5 to about 95% by weight of the chewing gum center, more typically from about 10 to about 50% by weight of the chewing gum center, and most commonly from about 25 to about 35% by weight of the chewing gum center.

The water soluble portion of the chewing gum center may include softeners, bulk sweeteners, high intensity sweeteners, flavoring agents and combinations thereof. Softeners such as glycerin are added to the chewing gum center in order to optimize the chewability and mouth feel of the gum. The softeners, which are also known as plasticizers or plasticizing agents, constitute from about 0.5 to about 15% by weight of the chewing gum center.

Aqueous sweetener solutions such as those containing sorbitol, hydrogenated starch hydrolysates, syrups of xylitol, lactitol, maltitol, hydrogenated isomaltulose and other polyols, corn syrup and combinations thereof, may also be used as softeners and binding agents in the chewing gum center.

Bulk sweeteners constitute from about 5 to about 90% by weight of the chewing gum center, more typically from about 20 to about 80% by weight of the chewing gum center and most commonly from about 30 to about 60% by weight of the chewing gum center. Bulk sweeteners preferably include sugarless sweeteners and components. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, lactitol, maltitol, hydrogenated isomaltulose, erythritol and the like, alone or in combination.

High intensity sweeteners may also be present and are commonly used with sugarless sweeteners. When used, high intensity sweeteners typically constitute from about 0.001 to about 5% by weight of the chewing gum center, preferably from about 0.01 to about 1% by weight of the chewing gum center. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin and the like, alone or in combination.

Combinations of sugar and/or sugarless sweeteners may be used in the chewing gum center. The sweetener may also function in the chewing gum in whole or in part as a water soluble bulking agent. The softener may also provide additional sweetness.

The flavoring agent should generally be present in the chewing gum center in an amount within the range of from about 0.1 to about 15% by weight of the chewing gum center, preferably from about 0.2 to about 5% by weight of the chewing gum center, most preferably from about 0.5 to about 3% by weight of the chewing gum center. Flavoring agents may include essential oils, synthetic flavors or mixtures thereof including but not limited to oils derived from plants and fruits such as citrus oils, fruit essences, peppermint oil, spearmint oil, other mint oils, clove oil, oil of wintergreen, anise and the like. Artificial flavoring agents and components may also be used in the chewing gum center. Natural and artificial flavoring agents may be combined in any sensorially acceptable fashion.

Optional ingredients such as colors, emulsifiers, pharmaceutical agents and additional flavoring agents may also be included in chewing gum center.

The chewing gum center is generally manufactured by sequentially adding the various chewing gum ingredients to any commercially available mixer known in the art. After the ingredients have been thoroughly mixed, the gum mass is discharged from the mixer and shaped into the desired form such as by extruding into chunks, or casting into pellets.

Generally, the ingredients are mixed by first melting the gum base and adding it to the running mixer. The gum base may alternatively be melted in the mixer. Color and emulsifiers can be added at this time.

A softener such as liquid sorbitol solution can be added next along with syrup and part of the bulk portion. Further parts of the bulk portion may then be added to the mixer. The flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

After the chewing gum center has been manufactured and shaped, the polyol-containing coatings can be applied. Pellet or ball gum is prepared as conventional chewing gum, but formed into pellets that are pillow-shaped or ball-shaped. The pellets or balls can then be sugar coated or panned by conventional panning techniques to make a unique, sugar-coated pellet gum. The polyols used in the coatings (lactitol, maltitol, hydrogenated isomaltulose or erythritol) are very stable and highly water soluble, and can be easily added to water to make a solution prepared for panning. Lactitol, maltitol, hydrogenated isomaltulose or erythritol may be combined with other polyols, or used alone in solution as the coating on pellet gum. Lactitol, maltitol, hydrogenated isomaltulose or erythritol can also be added as a powder blended with other powders often used in some types of conventional panning procedures. Using lactitol, maltitol, hydrogenated isomaltulose or erythritol sweetener isolates the sweetener from other gum ingredients and may modify its release rate in chewing gum. Lactitol, maltitol, hydrogenated isomaltulose or erythritol can also be used as panning modifiers with other panning materials to improve product quality. Antitack agents may also be added as panning modifiers, which allow the use of a variety of carbohydrates and sugar alcohols to be used in the development of new panned or coated gum products.

The coating is initially present as a liquid syrup which contains from about 30 to about 80 or 85 weight percent of the coating ingredients previously described herein, and from about 15 or 20 to about 70 weight percent of a solvent such as water. In general, the hard coating process is carried out in a rotating pan. Sugarless gum center tablets to be coated are placed into the rotating pan to form a moving mass.

The material or syrup which will eventually form the hard coating is applied or distributed over the gum center tablets. Flavoring agents may be added before, during and after applying the syrup to the gum centers. Once the coating has dried to form a hard surface, additional syrup additions can be made to produce a plurality of coatings or multiple layers of hard coating.

In the hard coating panning procedure, syrup is added to the gum center tablets at a temperature range of from about 100° F. to about 200° F. Preferably, the syrup temperature is from about 150° F. to about 170° F. Most preferably, the syrup temperature should be maintained at about 158° F. throughout the process in order to prevent the polyol in the syrup from crystallizing. The syrup may be mixed with, sprayed upon, poured over, or added to the gum center tablets in any way known to those skilled in the art.

Each component of the coating on the gum center tablets may be applied in a single hard layer or in a plurality of hard layers. In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Preferably, no more than about 75 coats are applied to the gum center tablets. More preferably, less than about 60 coats are applied and most preferably, about 30 to about 60 coats are applied. In any event, the present invention contemplates applying an amount of syrup sufficient to yield a dual composition hard coated chewing gum product containing about 10 to about 65 weight percent coating. Preferably, the final product will contain from about 20 to about 50 weight percent hard coating.

Those skilled in the art will recognize that in order to obtain a plurality of hard coated layers, a plurality of premeasured aliquots of coating syrup may be applied to the gum center tablets. It is contemplated, however, that the volume of aliquots of syrup applied to the gum center tablets may vary throughout the coating procedure.

The present invention contemplates that a flavoring agent may be added to the syrup, or applied to the gum center tablets while the syrup coating is drying or after the coating has dried. Furthermore, the flavoring agent may be applied anywhere within the sequence of coats, for example, after the third, twelfth, eighteenth, etc., coats.

Once a coating of syrup is applied to the gum center tablets, the present invention contemplates drying the wet syrup in an inert medium. A preferred drying medium comprises air. Preferably, forced drying air contacts the wet syrup coating in a temperature range of from about 80° to about 115° F. More preferably, the drying air is in the temperature range of from about 90° to about 105° F. The invention also contemplates that the drying air possess a relative humidity of less than about 15 percent. Preferably, the relative humidity of the drying air is less than about 8 percent.

The drying air may be passed over and admixed with the syrup coated gum centers in any way commonly known in the art. Preferably, the drying air is blown over and around the syrup coated gum center at a flow rate, for large scale operations, of about 2800 cubic feet per minute. If lower quantities of material are being processed, or if smaller equipment is used, lower flow rates would be used. If a flavoring agent is applied after a syrup coating has been dried, the present invention contemplates drying the flavoring agent with or without the use of a drying medium.

A wide range of changes and modifications to the embodiments of the invention described above will be apparent to persons skilled in the art. For example, while the invention is described with respect to hard-coated chewing gum, it will be appreciated that the dual coating process is applicable to coating other food products, such as candies, in which a dual polyol coating would have utility.

EXAMPLES

The invention will now be illustrated with Examples, which are not to be construed as imposing limitations on the invention.

Three gum center compositions, having the formulas in Table I, can be made on production scale equipment and can be used in various coating tests.

TABLE I

|  | Center Formula A | Center Formula B | Center Formula C |
|---|---|---|---|
| Sorbitol | 48.06 | 43.64 | 44.06 |
| Base | 33.0 | 33.0 | 33.0 |
| Calcium Carbonate | 13.0 | 13.0 | 13.0 |
| Glycerin | 4.0 | 6.5 | 8.0 |
| Peppermint Flavor | 1.8 | 2.5 | 1.8 |
| Water | — | 0.8 | — |
| Color | — | 0.2 | — |
| Encapsulated Aspartame | 0.14 | 0.36 | 0.14 |
| TOTAL | 100.00 | 100.00 | 100.00 |

In addition, gum center formulations in Table II without calcium carbonate can be used in coating tests.

TABLE II

|  | Center Formula D | Center Formula E | Center Formula F |
|---|---|---|---|
| Sorbitol | 48.9 | 48.9 | 48.9 |
| Base | 33.0 | 33.0 | 33.0 |
| Mannitol | 12.0 | 10.0 | 8.0 |
| Glycerin | 4.0 | 6.0 | 8.0 |
| Peppermint Flavor | 1.8 | 1.8 | 1.8 |
| Encapsulated Aspartame | 0.3 | 0.3 | 0.3 |
| TOTAL | 100.00 | 100.00 | 100.00 |

Gum center formulations can also be made using hydrogenated starch hydrolyzates (HSH) that may be evaporated to 80% solids or may also be coevaporated with glycerin to give various sugar-free center formulas as in Table III.

TABLE III

|  | Center Formula G | Center Formula H | Center Formula I | Center Formula J |
|---|---|---|---|---|
| Sorbitol | 44.3 | 42.3 | 40.9 | 40.9 |
| Base | 30.0 | 30.0 | 33.0 | 33.0 |
| Mannitol | 8.0 | 12.0 | 10.0 | 8.0 |
| HSH | 14.0 | 10.0 | — | — |
| Glycerin | 2.0 | 4.0 | 4.0 | 3.0 |
| Peppermint Flavor | 1.5 | 1.5 | 1.8 | 1.8 |
| Encapsulated Aspartame | 0.2 | 0.2 | 0.3 | 0.3 |
| Coevaporated HSH/Glycerin | — | — | 10.0 | 13.0 |
| TOTAL | 100.00 | 100.00 | 100.00 | 100.00 |

The gum center formulations in Table I and II are typical of anhydrous gum formulations having less than about 1% moisture. In Table III using HSH and glycerin, formulations contain more than 1% moisture.

Gum center formulations that contain greater than 1% moisture may use liquid sorbitol (70% solids) to give center formulations that are less hygroscopic than the previous formulations in Table I, II and III. Formulas in Table IV may also be used as needed.

TABLE IV

|  | Center Formula K | Center Formula L | Center Formula M | Center Formula N | Center Formula O |
|---|---|---|---|---|---|
| Sorbitol | 50.4 | 47.4 | 42.9 | 41.9 | 41.9 |
| Base | 27.0 | 27.0 | 35.0 | 35.0 | 35.0 |
| Sorbitol Liquid | 9.0 | 12.0 | 10.0 | 14.0 | 10.0 |
| Mannitol | 10.0 | 12.0 | 10.0 | 6.0 | — |
| Glycerin | 2.0 | — | — | 1.0 | — |
| Peppermint Flavor | 1.4 | 1.4 | 1.8 | 1.8 | 1.8 |
| Encapsulated Aspartame | 0.2 | 0.2 | 0.3 | 0.3 | 0.3 |
| Calcium Carbonate | — | — | — | — | 11.0 |
| TOTAL | 100.00 | 100.00 | 100.00 | 100.00 | 100.00 |

Center formulations may also include the other polyols that are used in the coating. Various levels of lactitol, maltitol, hydrogenated isomaltulose and erythritol may be used in the center and may actually be the major component in the center formula as in Table V.

TABLE V

|  | Center Formula P | Center Formula Q | Center Formula R | Center Formula S |
|---|---|---|---|---|
| Base | 30.0 | 30.0 | 30.0 | 30.0 |
| Lactitol | 55.3 | — | — | — |
| Maltitol | — | 58.3 | — | — |
| Hydrogenated Isomaltulose | — | — | 55.3 | — |
| Erythritol | — | — | — | 66.3 |
| HSH | 8.0 | 8.0 | 8.0 | 2.0 |
| Glycerin | 5.0 | 2.0 | 5.0 | — |
| Peppermint Flavor | 1.5 | 1.5 | 1.5 | 1.5 |
| Encapsulated Aspartame | 0.2 | 0.2 | 0.2 | 0.2 |
| TOTAL | 100.00 | 100.00 | 100.00 | 100.00 |

The center formulas in Tables I through V may be the core for any of the following coating examples using the combination of polyols of lactitol, maltitol, hydrogenated isomaltulose and erythritol.

Example 1—HYDROGENATED ISOMALTULOSE AND ERYTHRITOL COATING

Using any center formula from Tables I through V, pellets can be coated with an erythritol syrup and a hydrogenated isomaltulose syrup which provide a coating of 48.5% hydrogenated isomaltulose, 46% erythritol, 3.4% gum arabic, 1.2% peppermint flavor and 0.9% titanium dioxide, then polished with carnauba wax.

The first coating solution (used for the first approximately 20 coats) can contain a 75% hydrogenated isomaltulose solids syrup, gum arabic as a 33% aqueous solution, and titanium dioxide. The second coating syrup can contain an 75% erythritol solids syrup, gum arabic as a 33% aqueous solution, and titanium dioxide. The second coating solution (used for the last approximately 20 coats) can contain twice the amount of gum arabic as the first and substitute erythritol for hydrogenated isomaltulose, but may otherwise be the same as the first solution. About 40 coats in total can be applied, with half the flavor added at the 5th coat, and the other half at the 10th coat. The product will be 34.5% hydrogenated isomaltulose and erythritol coating, and 65.5% gum center.

Example 2—LACTITOL AND ERYTHRITOL COATINGS

Using any center formula from Tables I through V, 2500 grams of pellets can be coated with lactitol in the first coating syrup, then erythritol in the second coating syrup. For the first coating syrup, a coating solution of 1200 grams of lactitol, 66 grams of gum arabic, 10 grams $TiO_2$ and 933 grams of water can be prepared, heated to boiling, and held at 160° F. During coating, half of 5.5 grams of peppermint flavor can be added to each of the 12th and 20th coats. With the initial piece weight at 1.04 grams, pellets can be coated with lactitol to a piece weight of 1.33 grams for a product which is 21.8% lactitol coating and 78.2% gum center. For the second coating solution, an erythritol coating solution can be prepared by mixing 420 grams of erythritol, 38 grams of gum arabic, 10 grams $TiO_2$ and 236 grams of water. A 1000 gram quantity of the lactitol-coated gum can then be coated with the erythritol coating solution to a piece weight of 1.58 grams, for a product which is 34.2% lactitol and erythritol coating, and 65.8% gum center.

Example 3—MALTITOL AND ERYTHRITOL COATINGS

Using any center formula from Tables I through V, 1500 grams of pellets can be coated with maltitol in the first coating syrup, then erythritol in the second coating syrup. A coating solution of 1200 grams of maltitol, 66 grams of gum arabic and 933 grams of water can be prepared, heated to boiling and held at 160° F. During coating, half of 6.6 grams of flavor is added to each of the 9th and 12th coats. With the initial piece weight of 0.94 grams, pellets can be coated with maltitol to a piece weight of 1.18 grams, for a product which is 20.3% maltitol coating and 79.7% gum center. The erythritol coating solution can be prepared as in Example 2 and used to overcoat 750 grams of the maltitol coated pellet to a piece weight of 1.44 grams, for a product which is 34.7% maltitol and erythritol coating, and 65.3% gum center.

Example 4—HYDROGENATED ISOMALTULOSE AND MALTITOL COATING

Using any center formula from Tables I through V, pellets can be coated with a maltitol syrup and a hydrogenated isomaltulose syrup which provided a coating of 48% hydrogenated isomaltulose, 48% maltitol, 1.9% gum arabic, 1.2% peppermint flavor and 0.9% titanium dioxide, then polished with carnauba wax.

The first coating solution (used for the first approximately 20 coats) can contain a 75% hydrogenated isomaltulose solids syrup, gum arabic as a 33% aqueous solution, and titanium dioxide. The second coating syrup can contain an 70% maltitol solids syrup, gum arabic as a 33% aqueous solution, and titanium dioxide. The second coating solution (used for the last approximately 20 coats) can contain the same amount of gum arabic as the first and substitute maltitol for hydrogenated isomaltulose, as indicated, but is otherwise the same as the first solution. About 40 coats in total can be applied, with half the flavor added at the 5th coat, and the other half at the 10th coat. The product will be 34.5% hydrogenated isomaltulose and maltitol coating, and 65.5% gum center.

Example 5—LACTITOL AND HYDROGENATED ISOMALTULOSE COATINGS

Using any center formula from Tables I through V, 2500 grams of pellets can be coated with lactitol in the first coating syrup, then hydrogenated isomaltulose in the second coating syrup. For the first coating syrup a coating solution of 1200 grams of lactitol, 66 grams of gum arabic, 10 grams $TiO_2$ and 933 grams of water an be prepared and heated to boiling, and held at 160° F. During coating, half of 5.5 grams of peppermint flavor can be added to each of the 12th and 20th coats. With the initial piece weight at 1.04 grams, pellets can be coated with lactitol to a piece weight of 1.33 grams for a product which is 21.8% lactitol coating and 78.2% gum center. For the second coating solution, a hydrogenated isomaltulose coating solution can be prepared by mixing 420 grams of hydrogenated isomaltulose, 10 grams of gum arabic, 10 grams $TiO_2$ and 236 grams of water. A 1000 gram quantity of the lactitol-coated gum can then be coated with the hydrogenated isomaltulose coating solution to a piece weight of 1.58 grams, for a product which is 34.2% lactitol and hydrogenated isomaltulose coating, and 65.8% gum center.

Example 6—MALTITOL AND LACTITOL COATINGS

Using any center formula from Tables I through V, 1500 grams of pellets can be coated with maltitol in the first coating syrup, then lactitol in the second coating syrup. A coating solution of 1200 grams of maltitol, 66 grams of gum arabic and 933 grams of water can be prepared and heated to boiling and held at 160° F. During coating, half of 6.6 grams of flavor can be added to each of the 9th and 12th coats. With the initial piece weight of 0.94 grams, pellets can be coated with maltitol to a piece weight of 1.18 grams, for a product which is 20.3% maltitol coating and 79.7 gum center. The lactitol coating solution can be prepared by mixing 1200 grams of lactitol, 20 grams of gum arabic, 10 grams $TiO_2$ and 900 grams of water and used to coat 1500 grams of the maltitol coated pellet to a piece weight of 1.44 grams for a product which is 34.7% maltitol and lactitol coating, and 65.3% center.

Example 7—ERYTHRITOL AND MALTITOL COATINGS

Using any center formula from Tables I through V, 1000 grams of pellet can be coated by first applying 20 applications of an erythritol solution containing 900 grams of erythritol, 66 grams of gum arabic, 10 grams of $TiO_2$ and 433 grams in the water. With the initial piece weight of 0.94 grams, pellets can be coated with erythritol to a piece weight of 1.18 grams, for a product which is 20.3% erythritol coating and 79.7% center. The maltitol coating solution can be prepared by mixing 1200 grams of maltitol, 20 grams of gum arabic, 10 grams of $TiO_2$ and 840 grams of water. A 1000 gram quantity of erythritol-coated gum can then be coated with the maltitol coating solution to a piece weight of 1.44 grams, for a product which is 34.7% erythritol and maltitol coating, and 65.3% center.

It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention.

We claim:

1. A dual composition hard coated chewing gum, comprising:

from about 35 to about 90 weight percent of a gum center, including a bulk portion, a chewing gum base and one or more flavoring agents; and from about 10 to about 65 weight percent of an outer coating containing from about 50 to about 100%, by weight, of at least one polyol selected from the group consisting of lactitol, maltitol, hydrogenated isomaltulose and erythritol, and which comprises at least two sequential layers, each containing about 50 to about 100%, by weight, of at least one polyol selected from the group consisting of lactitol, maltitol, hydrogenated isomaltulose and erythritol;

the layers constituting an inner component of the outer coating and an outer component of the outer coating;

the layers of the inner component of the outer coating comprising at least one polyol selected from the group consisting of lactitol, maltitol, hydrogenated isomaltulose and erythritol;

the layers of the outer component of the outer coating comprising at least one polyol selected from the group consisting of lactitol, maltitol, hydrogenated isomaltulose and erythritol; and wherein at least one polyol contained in the outer component of the outer coating is not present in the inner component of the outer coating.

2. A dual composition hard coated chewing gum according to claim 1, wherein layers of lactitol, maltitol or hydrogenated isomaltulose, constituting the inner component of the outer coating, are applied before layers of erythritol, constituting the outer component of the outer coating.

3. The dual composition hard coated chewing gum of claim 1 or claim 2, wherein the gum base includes an elastomer selected from the group consisting of polyisobutylene, isobutylene-isoprene copolymer, styrene butadiene rubber, natural latexes, and combinations thereof.

4. The dual composition hard coated chewing gum of claim 1 or claim 2, wherein the gum base includes a resin selected from the group consisting of polyvinyl acetate, terpene resins, ester gums, and combinations thereof.

5. The dual composition hard coated chewing gum of claim 1 or claim 2, wherein the gum base includes fats and oils selected from the group consisting of animal fats, vegetable oils, hydrogenated vegetable oils, partially hydrogenated vegetable oils, cocoa butter, and combinations thereof.

6. The dual composition hard coated chewing gum of claim 1 or claim 2, wherein the gum base includes a wax selected from the group consisting of paraffin wax, microcrystalline wax, candelilla wax, carnauba wax, polyethylene wax, and combinations thereof.

7. The dual composition hard coated chewing gum of claim 1 or claim 2, wherein the gum base includes a filler component selected from the group consisting of calcium carbonate, magnesium carbonate, talc, dicalcium phosphate, and combinations thereof.

8. The dual composition hard coated chewing gum of claim 1 or claim 2, wherein the gum base includes a softener selected from the group consisting of glycerol monostearate, glycerol triacetate, and combinations thereof.

9. The dual composition hard coated chewing gum of claim 1 or claim 2, wherein the layers of the outer coating include at least about 90% polyol, by weight.

10. The dual composition hard coated chewing gum of claim 1 or claim 2, wherein the layers of the inner component include from about 50 to 100%, by weight, of at least one polyol selected from the group consisting of lactitol, maltitol and hydrogenated isomaltulose.

11. The dual composition hard coated chewing gum of claim 1 or claim 2, wherein the layers of the inner component include at least about 90%, by weight, of at least one polyol selected from the group consisting of lactitol, maltitol and hydrogenated isomaltulose.

12. The dual composition hard coated chewing gum of claim 1 or claim 2, wherein the layers of the outer component include from about 50 to 100%, by weight, of erythritol.

13. The dual composition hard coated chewing gum of claim 1 or claim 2, wherein the layers of the outer component include at least about 90%, by weight, of erythritol.

14. A dual composition hard coated chewing gum, comprising:

from about 35 to about 90 weight percent of a gum center which includes a gum base, a bulk portion, and one or more flavoring agents; and from about 10 to about 65 weight percent of a dual composition hard outer coating which includes sequentially added layers, each layer comprising (a) from about 50 to 100% lactitol by weight;

(b) from about 50 to 100% maltitol by weight;

(c) from about 50 to 100% hydrogenated isomaltulose by weight; or (d) from about 50 to 100% erythritol by weight;

the layers constituting an inner component of the outer coating and an outer component of the outer coating;

the layers of the inner component of the outer coating comprising at least one polyol selected from the group consisting of lactitol, maltitol, hydrogenated isomaltulose and erythritol;

the layers of the outer component of the outer coating comprising at least one polyol selected from the group consisting of lactitol, maltitol, hydrogenated isomaltulose and erythritol; and wherein at least one polyol contained in the outer component of the outer coating is not present in the inner component of the outer coating.

15. The dual composition hard coated chewing gum of claim 14, wherein the bulk portion includes a sugarless sweetener selected from the group consisting of sorbitol, mannitol, xylitol, hydrogenated starch hydrolysates, lactitol, maltitol, erythritol, hydrogenated isomaltulose, and combinations thereof.

16. The dual composition hard coated chewing gum of claim 14, wherein the bulk portion includes a high intensity sweetener selected from the group consisting of sucralose, aspartame, salts of acesulfame, alitame, saccharin and its salts, cyclamic acid and its salts, glycyrrhizin, dihydrochalcones, thaumatin, monellin, and combinations thereof.

17. The dual composition hard coated chewing gum of claim 14, wherein the gum center constitutes from about 50 to about 80 weight percent of the dual composition hard coated chewing gum and the outer coating constitutes from about 20 to about 50 weight percent of the dual composition hard coated chewing gum.

18. The dual composition hard coated chewing gum of claim 14, wherein the layers of the outer coating each include at least about 90% of at least two polyols selected from the group consisting of lactitol, maltitol, hydrogenated isomaltulose and erythritol.

19. The dual composition hard coated chewing gum of claim 14, wherein the layers of the inner component include at least about 90% lactitol, maltitol or hydrogenated isomaltulose, by weight; and wherein the layers of the outer component include at least about 90% erythritol, by weight.

20. A method of forming a dual composition hard coated chewing gum, comprising the steps of:

(1) forming a gum center including a bulk portion, a chewing gum base portion and one or more flavoring agents;

(2) forming a first polyol liquid coating syrup comprising solvent and from about 50% to the point of saturation of at least one polyol selected from the group consisting of lactitol, maltitol, hydrogenated isomaltulose and erythritol, by weight of the polyol liquid coating syrup;

(3) applying a plurality of coats of the first polyol liquid coating syrup to the gum center;

(4) forming a second polyol liquid coating syrup comprising solvent and from about 50% to the point of saturation of at least one polyol selected from the group consisting of lactitol, maltitol, hydrogenated isomaltulose and erythritol, by weight of the polyol liquid coating syrup, the composition of the second polyol liquid coating syrup containing a different polyol than the composition of the first polyol liquid coating syrup;

(5) applying a plurality of coats of the second polyol liquid coating syrup to the gum center which has been coated with the first polyol; and (6) evaporating the solvent from each coat of the first and second polyol liquid coating syrups, prior to applying the next coat; wherein the number of coats applied in steps (3) and (5) being sufficient to provide a coating of from about 10 to about 65 weight percent of the total coated chewing gum product, constituting an inner component of the outer coating and an outer component of the outer coating;

the layers of the inner component of the outer coating comprise at least one polyol selected from the group consisting of lactitol, maltitol, hydrogenated isomaltulose and erythritol;

the layers of the outer component of the outer coating comprise at least one polyol selected from the group consisting of lactitol, maltitol, hydrogenated isomaltulose and erythritol; and wherein at least one polyol contained in the outer component of the outer coating is not present in the inner component of the outer coating.

21. The method of claim 20, wherein the first and second liquid coating syrups each comprise at least about 30% polyol, by weight of the respective liquid coating syrup.

22. The method of claim 20, wherein the liquid coating syrup further comprises a flavoring agent.

23. The method of claim 20, wherein the liquid coating syrup further comprises a whitener.

24. The method of claim 20, wherein the liquid coating syrup further comprises an artificial sweetener.

25. The method of claim 20, wherein the liquid coating syrup is applied to the chewing gum center by spraying.

26. The method of claim 20, wherein the solvent for the liquid coating syrup comprises water.

27. The method of claim 20, wherein layers of the outer coating include at least two polyols selected from the group consisting of lactitol, maltitol, hydrogenated isomaltulose and erythritol.

28. The method of one of claims 20–27, wherein layers of polyol coating containing at least one polyol selected from the group consisting of lactitol, maltitol and hydrogenated isomaltulose are applied before layers of coating containing erythritol.

* * * * *